Aug. 23, 1938.  G. V. RYLSKY  2,127,833

RATE OF CLIMB INDICATOR

Filed Sept. 17, 1936

Inventor

Gregory V. Rylsky

By Stephen Cerstvik

Attorney

Patented Aug. 23, 1938

2,127,833

UNITED STATES PATENT OFFICE 2,127,833

RATE OF CLIMB INDICATOR

Gregory V. Rylsky, New York, N. Y., assignor to Bendix Aviation Corporation, South Bend, Ind., a corporation of Delaware Application September 17, 1936, Serial No. 101,347

11 Claims. (Cl. 264—1)

This invention relates to pressure responsive indicating instruments of the type in which the pressure responsive element is actuated by a pressure differential established between the pressure of the atmosphere surrounding the element and the pressure within said element upon a change in one of said pressures, and in which provision is made for equalization of said pressures when said change no longer takes place. An example of such an instrument is a rate of climb indicator, and the invention is illustrated and described hereinafter in connection with such an instrument, but it will be understood that it is not restricted to this particular use.

Instruments of this type as heretofore known have provided for equalization of pressure through a capillary tube, but in my copending application Serial No. 101,346, filed September 17, 1936, I have disclosed the use of diffusing means whereby the atmosphere passes into and out of the pressure responsive element by molecular diffusion to secure equilibrium of said pressures, thus eliminating the usual capillary tube. One of the objects of the present invention is to provide an instrument operating on the principle of my aforesaid application but of novel form and construction which is simple and inexpensive to manufacture and yet reliable and accurate in operation.

Another object of this invention is to provide a novel instrument of the type characterized above wherein the pressure responsive element is of the Bourdon tube type.

Another object of this invention is to provide a novel rate of climb indicator that is accurate and sensitive for all ranges of altitudes and which requires no compensation for altitude changes.

A still further object of this invention is to provide a novel rate of climb indicator in which the moving elements have been reduced to a minimum.

A further object of this invention is to provide a novel rate of climb indicator in which the number of parts required have been reduced to a minimum.

Other and further objects of this invention will appear in the description of the invention and in the appended claims.

Figure 1:
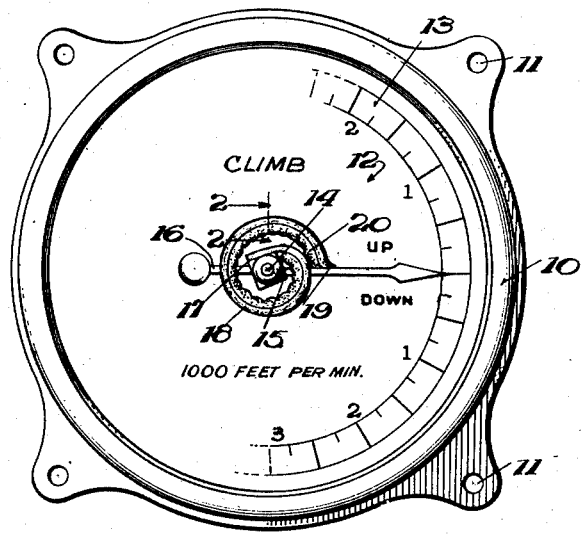
Figure 2:
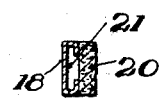

In the attached drawing Fig. 1 shows a plan view of one embodiment of my invention;

Fig. 2 is a cross section of the actuating element on the line 2—2 of Fig. 1.

In these figures, in which like reference numerals designate like parts, the instrument case 10 may be of any suitable form and construction and as shown is provided with suitable means such as the screw or bolt holes 11 for mounting the instrument. Carried by case 10 is a face plate 12 on which a scale 13 is marked in any suitable way for cooperation with a rotatable pointer actuated by the novel pressure responsive means described hereinafter. In the form shown, a pointer shaft 14 is journaled in a stationary block 15, and secured to and rotatable with said shaft 14 is a pointer 16 designed to travel over the scale 13.

Pressure responsive actuating means are employed to operate the pointer 16, which means operate in a manner similar to the well known Bourdon tube when a pressure differential is established between the inside and outside thereof. To provide for the restoration of equilibrium of pressure when a change in pressure no longer takes place, a part of said means comprises a diffusing medium so arranged as to permit equalization of pressure inside and outside of said means by molecular diffusion. As shown herein, said means takes the form of a pressure responsive element of spiral formation which is operatively interposed between a stationary part of the instrument and the pointer 16. Referring to Fig. 1, one end 17 of a flexible spiral element 18 is rigidly connected to the block 15, the other end 19 of said spiral element terminating in a shoe suitably attached to the pointer 16 or said element may merely abut the pointer in which case a biasing spring (not shown) would be used. Said spiral element comprises a very thin metal strip shaped as shown in Fig. 2 and having firmly adhered thereto a layer 20 of diffusing material which may be porous platinum or other suitable porous material, such as carbon, porcelain, compressed powder or metal wool, paper, very thin gold leaf, etc., as set forth in co-pending application 101,346 to which reference is made as to the particular structure of the various materials, said strip and layer cooperating to form an enclosed pressure space. As seen in Fig. 2, said spiral 18 may take the form of a strip, shaped to form a channel, in which case the pressure space comprises a pressure chamber 21 and the openings or pores in the diffusing medium. The volume of the pressure space or pressure chamber may obviously be varied as desired by varying the number of convolutions or the diameter thereof.

Supposing the various parts to be in the position shown in Fig. 1, a sudden increase in the altitude at which the instrument is located is accompanied by a decrease in the pressure of the atmosphere surrounding the instrument and that within the instrument case surrounding the spiral element 18. The pressure within the porous layer 20 cannot instantaneously equalize itself with the decreased pressure on the outside as the gases within the porous layer must diffuse relatively slowly through the porous layer. The pressure within the porous layer is therefore greater than that on the outside, the magnitude of pressure differential depending upon the rate at which the pressure on the outside of the porous layer is decreasing, that is, upon the rate at which the altitude is increasing. The pressure within the porous body being greater than that on the outside, the spiral member 18 will unwind or straighten out and pointer 16 will be swung upwardly over the scale 13, as seen in Fig. 1, so that the rate of climb can be read therefrom. If the increase in altitude is stopped and the instrument held at a constant altitude, the pressure within the porous layer will equalize with the pressure surrounding it and the spiral 18 will retract to its normal position and return the pointer 16 to its normal or zero position.

If the altitude is suddenly decreased the pressure surrounding the porous layer is increased in magnitude depending on the rate of decrease of altitude. The pressure within the porous layer cannot instantly equalize with the greater pressure surrounding it as the gases surrounding the porous layer must diffuse relatively slowly into the porous layer. The pressure surrounding the spiral 18 is therefore greater than the pressure within the porous layer and this pressure differential causes spiral 18 to contract, causing pointer 16 to move downward as seen in Fig. 1, to indicate the rate of decrease of altitude. When the decrease in altitude has stopped and the instrument remains at a constant altitude, the pressure within the porous layer will be equalized with that outside the layer. The equalization of the pressure within and without the porous layer allows spiral member 18 to return to its normal position and pointer 16 is swung in a counterclockwise direction until its normal or zero position is reached.

Preferably the spiral metal strip is made of any material, such as nichrome, which has a low coefficient of expansion for temperature changes, whereby the strip is rendered insensitive to temperature changes and there is no need for temperature compensators. Further, due to the nature of the porous materials used in the present invention, the pressure differentials will remain the same whether the increase or decrease in altitude to be measured takes place at high or low altitudes. Consequently for a given rate of change in altitude, whether at high or low altitude, the pressure differential will be the same, the displacement of the pointer 16 will be the same and the instrument will give a uniform reading for changes in altitude regardless of the altitude at which they occur. Hence, it is obvious that no altitude compensator need be used with the present invention.

It is further apparent from the above description that the present invention affords a rate of climb indicator in which the number of moving parts has been reduced to a minimum, which is simple in construction, accurate in operation, cheap in manufacture and dependable under all conditions of operation, and that the advantages of the invention may be obtained in any instrument embodying the foregoing operation and is accordingly not restricted to climb indicators but may also be applied to such devices as specific gravity indicators and fire alarms operated by a change in specific gravity of a heated fluid.

As disclosed in my aforesaid prior application, there are many suitable diffusing materials which may be used other than porous metal such as platinum as referred to above, many of which will readily occur to those skilled in the art. Further it will be apparent that the form and construction of the pressure responsive actuating means may vary widely and that changes may be made in the form, details of construction, and arrangement of the parts without departing from the spirit of the invention. Reference should therefore be had to the appended claims as a definition of the limits of the invention.

What is claimed is:

1. In an indicating instrument of the class described, a pressure responsive element comprising a curved strip and a diffusing layer for said strip, said layer and said strip forming between them a pressure chamber.

2. In an indicating instrument of the class described, a pressure responsive element comprising a curved strip having a low coefficient of thermal expansion and faced with a diffusing layer, said strip and said layer forming between them a pressure chamber.

3. In an indicating instrument of the class described, a pressure responsive element comprising a curved strip of nichrome faced with a layer of porous platinum and forming with the layer of porous platinum a pressure chamber.

4. In an indicating instrument of the class described, a pressure responsive element comprising a curved strip U-shaped in cross section and closed by a strip of diffusing material to form a pressure chamber.

5. In an indicating instrument of the class described, a pressure responsive element comprising a curved strip formed of a material of low coefficient of thermal expansion, said strip being U-shaped in cross section and closed by a strip of diffusing material to form a pressure chamber.

6. In an indicating instrument of the class described, a pressure responsive element comprising a curved strip of nichrome U-shaped in cross section and closed by a strip of porous platinum to form a pressure chamber.

7. In a rate of climb indicator, a pivot, a pointer rotatably mounted on said pivot, a scale for said pointer, and means for moving said pointer over said scale comprising a curved strip of material faced on the inside with a layer of diffusing material, said strip and said layer forming between them a gas chamber, said strip being fixed at one end and engaging said pointer at the other.

8. In a rate of climb indicator, a pivot, a pointer rotatably mounted on said pivot, a scale for said pointer and means for moving said pointer over said scale comprising a curved strip of material having a low coefficient of thermal expansion and faced on its inner side with a layer of diffusing material, said strip and said layer forming between them a gas chamber, said strip being fixed at one end and engaging said pointer at the other.

9. In a rate of climb indicator, a pivot, a pointer rotatably engaging said pivot, a scale for said pointer and means for moving said pointer over said scale comprising a spiral of nichrome faced on its inner surface with a layer of porous platinum and forming with it a gas chamber, said spiral being fixed at one end to said pivot and engaging said pointer at the other.

10. In a rate of climb indicator, a pivot, a pointer rotatably mounted on said pivot, a scale for said pointer and means for moving said pointer over said scale comprising a curved strip of material U-shaped in cross section and closed by a strip of porous diffusing material to form a pressure chamber, said strip being fixed at one end and engaging said pointer at the other.

11. In an indicating instrument of the class described, a pressure responsive element comprising a pressure chamber, and means enclosing said chamber including a layer of diffusing material forming a curved wall at certain values of the pressure in said chamber.

GREGORY V. RYLSKY.